HAWBECKER & THOMAS.
Horse Hay-Fork.
No. 90,098.
Patented May 18, 1869.
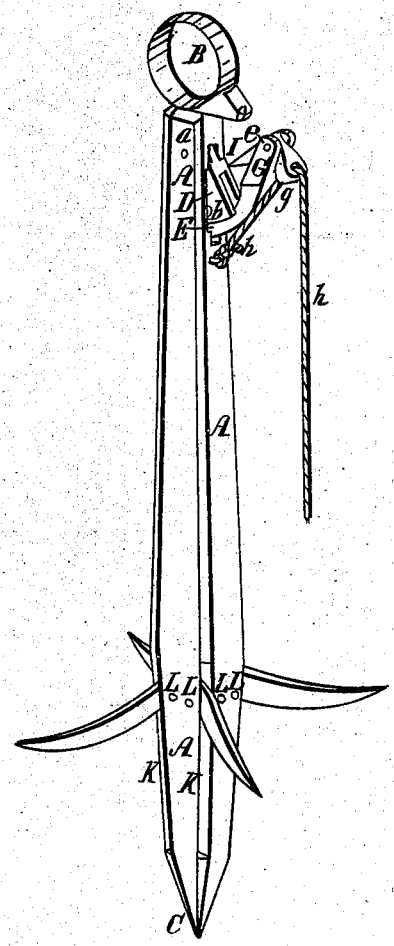
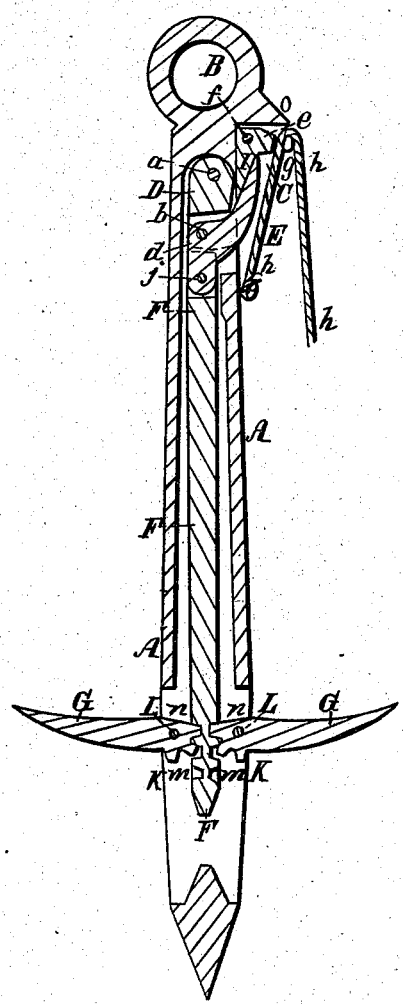

United States Patent Office.

SAMUEL Z. HAWBECKER, OF UPTON, AND ABRAHAM THOMAS, OF ST. THOMAS, PENNSYLVANIA.

Letters Patent No. 90,098, dated May 18, 1869.

IMPROVEMENT IN HORSE HAY-FORKS.

The Schedule referred to in these Letters Patent and making part of the same.

*To all whom it may concern:*

Be it known that we, SAMUEL Z. HAWBECKER, of Upton, and ABRAHAM THOMAS, of St. Thomas, both in the county of Franklin, and State of Pennsylvania, have invented certain new and useful Improvements in Horse Hay-Forks; and we do hereby declare the following to be a full, clear, and exact description of the same, reference being had to the accompanying drawings, making a part of this specification, in which—

Figure 1 represents a perspective view of the fork with the barbs or tines thrown out, and Figure 2 represents a vertical section, taken centrally through the same.

Similar letters of reference, where they occur in the separate figures, denote like parts of the fork in both of the drawings.

Our invention consists in combining, with the rack-rod and segmental barbs or tines, a locking and tripping-lever, that is locked by the load on the barbs or tines, and tripped by a cord and lever, as will be explained.

To enable others skilled in the art to make and use our invention, we will proceed to describe the same with reference to the drawings.

A represents a hollow stock or handle, which may be made of wood or metal, or parts of each, and which has an eye, B, at its upper end, for the hoisting-rope or chain to be fastened into, and is sharpened at its lower end, C, so as to be readily inserted into the hay or other thing to be elevated by it.

Within this hollow stock or handle A, and near its upper end, as at $a$, there is pivoted an arm, D, which can be moved into or out of the interior of the handle, through an opening suitably made for that purpose.

To the arm D there is pivoted, as at $b$, a two-armed bent lever, E, the arm $c$ of which projects outward and upward, and the other arm, $d$, projects downward within the bore or hollow of the stock or handle A, as distinctly seen in fig. 2.

To the upper end of the arm $c$, there is pivoted, as at $e$, a lever-trigger, $f$, which is also two-armed, the one, $g$, projecting outward, and having a line, $h$, running through it, by which it is operated or tripped, and the other arm, $i$, extending inward and downward, so as to press against the arm D, and exert its leverage in forcing in the said arm D, and hold and lock it, and with it the forks or tines.

To the arm $d$ is pivoted, as at $j$, the upper end of the rod F, which works through the hollow interior of the stock or handle A, and which has, as its lower end, the cogged racks $m$, which take into the cogged segments $n$, on the hubs of the barbs or tines G, so that said barbs or tines may be moved into the stock when the load is to be discharged from them, or moved out when they are to catch and carry such load, suitable openings, $k$, being made for that purpose.

The barbs or tines G are pivoted to the stock, as at $l$, and we have shown four of them, preferring that number, but may use less or more, as we may deem it necessary or important to do so.

The load on the tines tends to lock them in their holding position, as said tines cannot swing downward unless the rod F can correspondingly move upward, and the latter cannot move upward until arm D is drawn outward by the line $h$, through the lever-trigger $f$ and two-armed lever E, so that the operator has entire and free control of the fork, and the aid of the lever $i$ to start and trip it.

That nothing may strike against the trigger-lever $f$ and trip the fork, a guard, $o$, is made on the ring or head B to protect it.

Having thus fully described our invention,

What we claim therein as new, and desire to secure by Letters Patent, is—

In combination with the geared rod and barbs or tines, the arm D, levers E and $f$, and cord $h$, for the purpose of holding, and for tripping the said barbs or tines, as may be required, and as set forth.

SAMUEL Z. HAWBECKER.
ABRAHAM THOMAS.

Witnesses:
A. B. STOUGHTON,
EDMUND MASSON.